US011521476B2

(12) United States Patent
Mishra et al.

(10) Patent No.: US 11,521,476 B2
(45) Date of Patent: Dec. 6, 2022

(54) SYSTEMS AND METHODS FOR VEHICLE-BASED ALERT SYSTEMS

(71) Applicant: CSAA Insurance Services, Inc., Walnut Creek, CA (US)

(72) Inventors: Chandan Mishra, Sunnyvale, CA (US); Tim Holland, Las Vegas, NV (US)

(73) Assignee: CSAA Insurance Services, Inc., Walnut Creek, CA (US)

( * ) Notice: Subject to any disclaimer, the term of this patent is extended or adjusted under 35 U.S.C. 154(b) by 0 days.

(21) Appl. No.: 17/122,710

(22) Filed: Dec. 15, 2020

(65) Prior Publication Data

US 2022/0189281 A1    Jun. 16, 2022

(51) Int. Cl.
| | | |
|---|---|---|
| *B60Q 5/00* | (2006.01) |
| *G08B 21/22* | (2006.01) |
| *B60N 2/00* | (2006.01) |
| *B60R 16/023* | (2006.01) |
| *G08B 5/22* | (2006.01) |
| *G08B 25/10* | (2006.01) |
| *G08B 21/18* | (2006.01) |
| *G01G 19/414* | (2006.01) |

(52) U.S. Cl.
CPC .............. *G08B 21/22* (2013.01); *B60N 2/002* (2013.01); *B60R 16/0237* (2013.01); *G08B 5/226* (2013.01); *G08B 21/182* (2013.01); *G08B 25/10* (2013.01); *G01G 19/4142* (2013.01)

(58) Field of Classification Search
CPC ...... G08B 21/22; G08B 5/226; G08B 21/182; B60N 2/002; B60R 16/0237; G01G 19/4142
See application file for complete search history.

(56) References Cited

U.S. PATENT DOCUMENTS

| | | | | |
|---|---|---|---|---|
| 9,381,855 | B1 * | 7/2016 | Arnold | G08B 21/22 |
| 9,845,050 | B1 * | 12/2017 | Garza | H04W 4/38 |
| 2017/0120813 | A1 * | 5/2017 | Wilson | B60Q 9/00 |
| 2020/0398637 | A1 * | 12/2020 | Chang | H04W 4/80 |

* cited by examiner

*Primary Examiner* — Hongmin Fan
(74) *Attorney, Agent, or Firm* — McDonnell Boehnen Hulbert & Berghoff LLP

(57) ABSTRACT

An example method is disclosed, the method comprising: (i) detecting, via a first sensor of an alert system configured for use with a vehicle, a living being inside the vehicle; (ii) measuring, via a second sensor, an environmental feature inside the vehicle; (iii) based at least on the detection of the living being and the measured environmental feature, determining, an alert condition inside the vehicle; (iv) selecting a first computational action based at least on the determined alert condition; (v) transmitting an instruction that causes a component of the vehicle to perform the selected first computational action; (vi) selecting a second computational action based at least on the determined alert condition; and (vii) transmitting, via a network interface, to at least one computing device that is remote from the alert system, an instruction that causes at least one remote computing device to perform the selected second computational action.

24 Claims, 7 Drawing Sheets

SYSTEMS AND METHODS FOR VEHICLE-BASED ALERT SYSTEMS

In this disclosure, unless otherwise specified and/or unless the particular context clearly dictates otherwise, the terms "a" or "an" mean at least one, and the term "the" means the at least one.

SUMMARY

In one aspect, an example alert system configured for use with a vehicle is disclosed. The alert system comprises: (a) a first sensor; (b) a second sensor; (c) a network interface configured to communicate with at least one computing device that is remote from the alert system; (d) one or more processors; and (e) a non-transitory, computer-readable medium storing instructions that, when executed by the one or more processors, cause the alert system to perform a set of acts comprising: (i) detecting, via the first sensor, a living being inside the vehicle; (ii) measuring, via the second sensor, an environmental feature inside the vehicle; (iii) based at least on the detection of the living being and the measured environmental feature, determining an alert condition inside the vehicle; (iv) selecting a first computational action based at least on the determined alert condition; (v) transmitting an instruction that causes a component of the vehicle to perform the selected first computational action; (vi) selecting a second computational action based at least on the determined alert condition; and (vii) transmitting, via the network interface, an instruction that causes the at least one remote computing device to perform the selected second computational action.

In another aspect, an example method is disclosed. The method includes (a) detecting, via a first sensor of an alert system configured for use with a vehicle, a living being inside the vehicle; (b) measuring, via a second sensor of the alert system, an environmental feature inside the vehicle; (c) based at least on the detection of the living being and the measured environmental feature, determining, by the alert system, an alert condition inside the vehicle; (d) selecting, by the alert system, a first computational action based at least on the determined alert condition; (e) transmitting, by the alert system, an instruction that causes a component of the vehicle to perform the selected first computational action; (f) selecting, by the alert system, a second computational action based at least on the determined alert condition; and (g) transmitting, via a network interface of the alert system, to at least one computing device that is remote from the alert system, an instruction that causes at least one remote computing device to perform the selected second computational action.

In another aspect, an example non-transitory computer-readable medium is disclosed. The computer-readable medium has stored thereon program instructions that, upon execution by a computing system, cause the computing system to perform a set of operations comprising: (a) detecting, via a first sensor of an alert system configured for use with a vehicle, a living being inside the vehicle; (b) measuring, via a second sensor of the alert system, an environmental feature inside the vehicle; (c) based at least on the detection of the living being and the measured environmental feature, determining, by the alert system, an alert condition inside the vehicle; (d) selecting, by the alert system, a first computational action based at least on the determined alert condition; (e) transmitting, by the alert system, an instruction that causes a component of the vehicle to perform the selected first computational action; (f) selecting, by the alert system, a second computational action based at least on the determined alert condition; and (g) transmitting, via a network interface of the alert system, to at least one computing device that is remote from the alert system, an instruction that causes at least one remote computing device to perform the selected second computational action.

DETAILED DESCRIPTION

I. Overview

Figure 1:
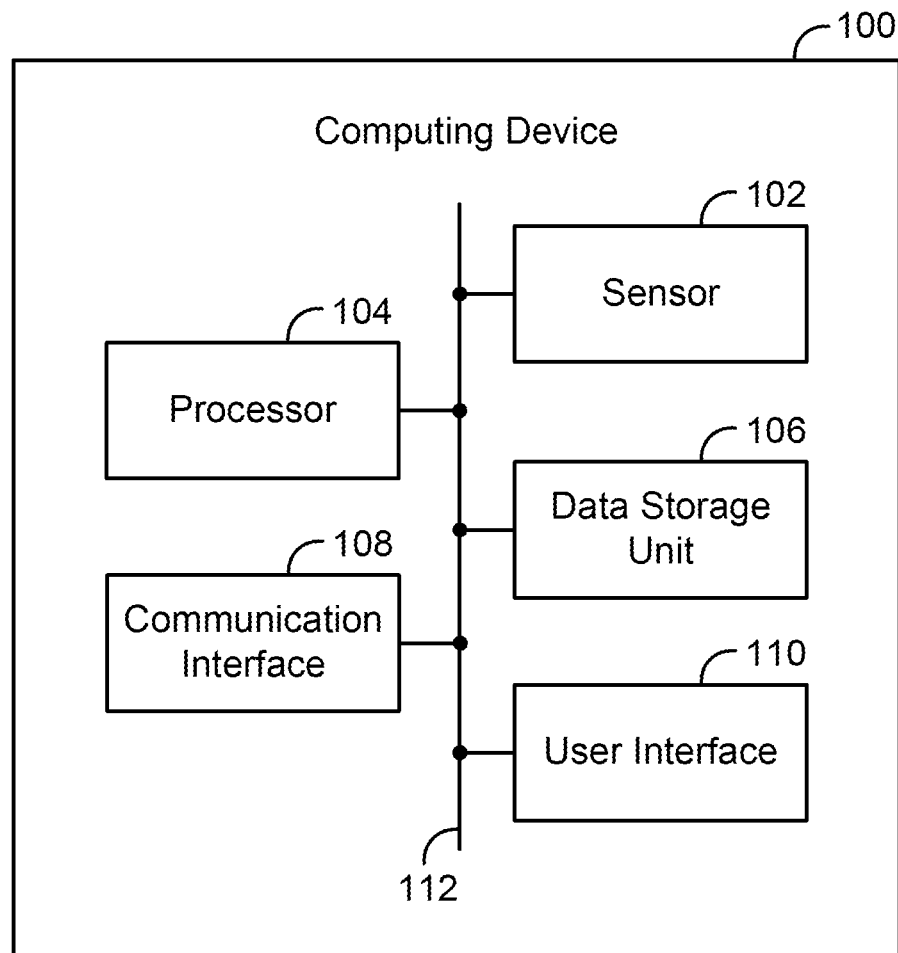
FIG. 1 is a simplified block diagram of an example computing device.

Every year, many adults, children, pets, and other living beings are left in vehicles and experience adverse conditions, such as dangerous temperatures. These adverse conditions may lead to injuries (and even death) for these vehicle occupants, particularly if the vehicle is locked, thereby potentially preventing living beings left inside the vehicle from exiting and/or people outside of the vehicle access to the occupants left behind in the vehicle.

To date, vehicle manufacturers and other companies have tried to address this issue in various ways. For example, some vehicles have features to help alleviate these adverse conditions. For example, some vehicles have a "dog mode" that engages the air conditioner to provide heating or cooling inside the vehicle, even after the driver exits and locks the vehicle. There are also third-party providers that can provide emergency assistance upon request from a customer.

These features, however, still rely on vehicle owners and/or occupants to consciously engage such features and/or take other responsive actions. These features may also be prone to errors and/or failure. For example, the vehicle may turn off due to running out of gas or battery charge and/or one or more safety features may otherwise fail or end prematurely. Thus, relying on existing technologies and features to address these issues presents disadvantageous results for vehicle owners and occupants, as well as the vehicle manufacturer.

If, however, these adverse conditions for these vehicle occupants could be detected and addressed more accurately and efficiently before these disadvantageous results occurred, then the vehicle occupants, vehicle owner, vehicle manufacturer, and others could benefit.

To address these concerns, one approach may include detecting, by an alert system configured for use with a vehicle, whether there is a living being inside the vehicle and measuring one or more environmental factors (e.g., adverse conditions) inside the vehicle. To do so, the alarm system may use one or more sensors associated with the vehicle (e.g., inside the vehicle). Then, based on detecting that there is a living being and/or measuring one or more environmental features inside the vehicle, the alarm system may also determine that there is alert condition inside the vehicle and take one or more responsive actions based on that determination. For example, the alert system may detect a living being inside the vehicle, measure the temperature inside the vehicle, and determine that an alert condition exists inside the vehicle because the measured temperature presents an unsafe condition for the living being. In response, the alert system may take one or more responsive actions to alleviate these potentially dangerous conditions (e.g., reducing the temperature inside the vehicle to a range of temperatures that are typically safe for living beings), among other possibilities.

Embodiments of the present disclosure provide systems, methods, and devices for improving the safety of these vehicles and taking responsive actions by collecting information inside of a vehicle and comparing the collected information with information previously collected inside that vehicle and/or other vehicles that share one or more attributes with that vehicle (e.g., same make, model, etc.). The alert system may also use this comparison to determine whether an alert condition exists inside the vehicle at any given moment. Based on determining this alert condition, the alert system may take one or more responsive actions to address potentially dangerous conditions inside the vehicle using components of the vehicle to alleviate the dangerous conditions, as well as alert nearby parties, as well as those that are remote.

More specifically, example embodiments relate to methods, systems, and devices that allow an alert system configured for use with a vehicle to assess potentially dangerous conditions for living beings inside a vehicle (e.g., infants, children, and pets), all without potentially requiring any conscious input from the vehicle owner. In a further aspect, these example embodiments also implement different means of mitigating these potentially dangerous conditions for the vehicle occupants (e.g., turning on the air conditioner inside the vehicle, lowering the vehicle's windows slightly), as well as alerting other parties outside the vehicles, nearby (e.g., by flashing the vehicles lights, sounding the horn) and/or remote from the vehicle (e.g., by sending an alert message to a remote computing device associated with the vehicle owner and/or one or more emergency services), among other possibilities.

To facilitate this determination and the potential responsive actions taken by the alert system, the alert system may use one or more components to carry out various steps of this process. These components may include, among other things, one or more sensors for detecting and measuring various factors inside the vehicle, one or more processors facilitating analysis of these factors and taking responsive computational actions, and a network interface that allows the alert system to communicate with other devices that are remote from the vehicle (e.g., a computing device that is associated with the vehicle owner and/or others). Furthermore, any of these components (or the alert system itself) may be integrated in a vehicle during manufacture or implemented thereafter, potentially using one or more vehicle's existing components. For example, one or more of the alert system's components (or the alert system itself) may be powered by and/or integrated with the vehicle's on-board diagnostic (ODB) and/or charging ports, among other possibilities. Additionally, by integrating with these ports, the alert system may leverage and/or invoke action from one or more vehicle components associated with the ports (e.g., the alert system may control one or more components of the vehicle via its connection with the vehicle's ODB port). Further details of example embodiments of this alert system are provided below.

In some examples, the alert system may detect whether there is a living being inside the vehicle and may use one or more sensors to do so. In one example, the alert system may use one or more weight sensors to detect whether a living being is sitting in one or more seats inside the vehicle. In some examples, the weight detection sensors may detect if and/or how much weight is applied to one or more seats in the vehicle. In other examples, the weight detection sensor may detect variances in the weight applied to one or more seats or regions inside the vehicle, which may indicate the presence of a living being inside the vehicle (e.g., movement inside the vehicle). In some examples, the weight detection sensor may be integrated into vehicle seat upon manufacture and/or installed in the vehicle after manufacture as part of an aftermarket device (e.g., placed under and/or integrated into a child's car seat).

In still other examples, additional or alternative sensors can be used to detect a living being inside the vehicle, including: (i) a seat belt detection sensor (e.g., a sensor that detects if a seatbelt is connected and/or if the seatbelt is pulled on while connected); (ii) a sound detection sensor (e.g. a sensor that detects sounds and/or sound levels inside the vehicle indicating a living being); (iii) a motion sensor; (iv) a thermal imaging sensor (e.g., an infrared sensor to detect if there is a thermal body inside the vehicle); (v) a humidity sensor; (vi) an ultra-wide beam sensor (e.g., a sensor to detect and monitor heartbeats of a living being inside the vehicle); and (vii) a capacitance sensor (e.g., a sensor to detect moisture in a seat in the vehicle), among other possibilities.

The alert system may also measure one or more environmental factors inside the vehicle and may use one or more sensors to do so (including some of the sensors described above used to detect a living being inside the vehicle). In some examples, the alert system may use one or more sensors to measure the following environmental features inside the vehicle: (i) temperature; (ii) humidity; (iii) oxygen level; (iv) carbon monoxide level; and/or (v) sound, among other possibilities. Like the sensors used to detect living beings described above, the sensors used to measure environmental factors may be integrated into various components of the vehicle. Additionally, these sensors may be implemented and/or arranged in the vehicle in various ways, depending on the positioning that provides the most advantageous measurements. For example, the motion and/or thermal imaging sensors may be positioned around or integrated into the rearview mirror and/or ceiling of the vehicle to provide the maximum imaging perspective for the interior of the vehicle. Other examples are possible.

In still other examples, additional or alternative sensors can be used to determine the proximity of a computing device that may be remote from the alert system (e.g., outside the vehicle). For example, one or more sensors can be used to determine the proximity of a remote computing device that is associated with the vehicle. For example, the alert system may use one or more sensors to detect the proximity of a remote computing device that has been previously associated with the vehicle (e.g., a Bluetooth sensor and/or communication protocol to determine the proximity of a mobile computing device that is associated with the vehicle owner). In other examples, the alert system may use one or more sensors to detect the proximity of a remote computing that has not been previously associated with the vehicle (e.g., a GPS sensor inside the vehicle and communication protocol to determine the proximity of a police station nearest the vehicle).

In a further aspect, based on: (i) detecting a living being inside the vehicle; (ii) the measured environmental features inside the vehicle; and/or (iii) the determined proximity of the remote computing device, the alert system may determine that an alert condition exists inside the vehicle, and may do so in a number of ways. In some examples, the alert system may determine that an alert condition exists inside of the vehicle by detecting that a living being is inside the vehicle and that the measured environmental factors inside the vehicle presents a potentially dangerous condition for the living being inside the vehicle. In some examples, the alert system may compare the detection of the living being and the measured environmental factor to an anticipated operational state the vehicle and determine that either or both do not correspond to the anticipated operational state of the vehicle.

For example, the alert system may compare the detection of a living being and measured environmental factor to previous detections and measurements made by the alert system at a particular time and determine that they do not correspond. In one example, the alert system may use one or more machine learning training sets to determine a typical set of parameters for the vehicle during operation (e.g., which seats in a vehicle typically have weight applied to them (and how much), an average temperature range inside the vehicle during operation, an average sound level inside the vehicle while not in operation, etc.), all or some of which may be used to establish an anticipated operational state of the vehicle. In a further aspect, the anticipated operational state of the vehicle may be based on detections and/or measurements made for a vehicle that has one or more attributes in common with the vehicle (e.g., average interior temperature, sound, and/or humidity ranges for vehicles in the geographic region of the vehicle, average weight applied to one or more seats of a vehicle of the same make and model of the vehicle while not in operation, etc.). In a further aspect, the alert system may then compare the detection of a living being and measured environmental factor at a given time to the anticipated operational state and determine that they do not correspond.

Additionally, as more operation data and information is collected using the alert system (both in the vehicle and other vehicles), the more the alert system will improve based on feedback collected from the users, which in turn will improve the alert system's ability to detect and analyze a variety of vehicle situations and/or determine whether an alert condition exist at any given moment inside the vehicle.

In other examples, once the alert system determines that an alert condition exists inside the vehicle, the alert system may then select one or more computational actions and transmit instructions to one or more devices to perform the selected one or more computational actions. For example, the alert system may determine that an alert condition exists inside the vehicle and, based on that alert condition, select a computational action to be performed by one or more components of the vehicle. For example, based on the alert condition, the alert system may select and transmit an instruction to a graphical user interface inside the vehicle to display an alert message (e.g., "EMERGENCY—DIALING POLICE"). In other examples, based on the alert condition, the alert system may select and transmit an instruction to one or more audio devices to emit an alert message outside of the vehicle (e.g., causing the vehicle's horn to emit sound repeatedly, an exterior speaker to emit "EMERGENCY—PLEASE HELP"). In yet other examples, based on the alert condition, the alert system may select and transmit an instruction to one or more lights of the vehicle to emit visual alerts (e.g., causing the vehicle's interior and/or exterior lights to flash repeatedly).

In a further aspect, once the alert system determines that an alert condition exists inside the vehicle, the alert system may also select a computational action to be performed by a computing device that is remote to the vehicle. For example, based on the alert condition, the alert system may select and transmit an instruction, via the network interface, to a computing device associated with the vehicle owner and/or operator to display an alert message (e.g., "EMERGENCY—A LIVING BEING HAS BEEN DETECTED IN YOUR VEHICLE—DANGEROUS CONDITIONS")— particularly if the alert system has also detected that the remote computing device is outside of a determined proximity of the vehicle.

In other examples, the alert system may select and transmit an instruction, via the network interface, to a remote computing device to provide emergency services to the vehicle. In one example, the alert system may select and transmit an alert message to one or more computing devices associated with one or more emergency service providers to provide emergency services to the vehicle (e.g., sending a request to a nearby police station computing device to provide emergency services to the vehicle). Other examples are possible.

These systems, methods, and devices may provide technical advantages and improve safety of vehicle operation by increasing an accuracy of an assessment and/or decreasing an amount of time taken to ensure that a living being inside the vehicle is not adversely affected by adverse conditions inside the vehicle. Other features of the systems, methods, and devices are described in further detail in the example embodiments provided below.

II. Example Architecture

A. Computing Device

FIG. 1 is a simplified block diagram of an example computing device 100. The computing device 100 can be configured to perform and/or can perform one or more acts and/or functions, such as those described in this disclosure. The computing device 100 can include various components, such as a sensor 102, a processor 104, a data storage unit 106, a communication interface 108, and/or a user interface 110. Each of these components can be connected to each other via a connection mechanism 112.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

The sensor 102 can include sensors now known or later developed, including but not limited to weight detection sensors, a seat belt detection sensor, a sound detection sensor, a motion sensor, a thermal imaging sensor, a humidity sensor, an ultra-wide beam sensor, a capacitance sensor (e.g., a sensor to detect moisture in a seat in the vehicle), a temperature sensor, an oxygen sensor, a carbon monoxide sensor, a proximity sensor (e.g., a Bluetooth sensor and/or communication protocol to determine the proximity of a mobile computing device that is associated with the vehicle owner), a location sensor (e.g., a GPS sensor), and/or a combination of these sensors, among other possibilities.

The processor 104 can include a general-purpose processor (e.g., a microprocessor) and/or a special-purpose processor (e.g., a digital signal processor (DSP)). The processor 104 can execute program instructions included in the data storage unit 106 as discussed below.

The data storage unit 106 can include one or more volatile, non-volatile, removable, and/or non-removable storage components, such as magnetic, optical, and/or flash storage, and/or can be integrated in whole or in part with the processor 104. Further, the data storage unit 106 can take the form of a non-transitory computer-readable storage medium, having stored thereon program instructions (e.g., compiled or non-compiled program logic and/or machine code) that, upon execution by the processor 104, cause the computing device 100 to perform one or more acts and/or functions, such as those described in this disclosure. These program instructions can define, and/or be part of, a discrete software application. In some instances, the computing device 100 can execute program instructions in response to receiving an input, such as an input received via the communication interface 108 and/or the user interface 110. The data storage unit 106 can also store other types of data, such as those types described in this disclosure.

The communication interface 108 can allow the computing device 100 to connect with and/or communicate with another entity, such as another computing device, according to one or more protocols. In one example, the communication interface 108 can be a wired interface, such as an Ethernet interface. In another example, the communication interface 108 can be a wireless interface, such as a cellular or WI-FI interface. In this disclosure, a connection can be a direct connection or an indirect connection, the latter being a connection that passes through and/or traverses one or more entities, such as a router, switch, or other network device. Likewise, in this disclosure, a transmission can be a direct transmission or an indirect transmission.

The user interface 110 can include hardware and/or software components that facilitate interaction between the computing device 100 and a user of the computing device 100, if applicable. As such, the user interface 110 can include input components such as a keyboard, a keypad, a mouse, a touch-sensitive panel, and/or a microphone, and/or output components such as a display device (which, for example, can be combined with a touch-sensitive panel), a sound speaker, and/or a haptic feedback system.

The computing device 100 can take various forms, such as a workstation terminal, a desktop computer, a laptop, a tablet, and/or a mobile phone. In a further aspect, the features described herein may involve some or all of these components arranged in different ways, including additional or fewer components and/or different types of components, among other possibilities.

B. Alert System Configured for Use with a Vehicle

Figure 2:
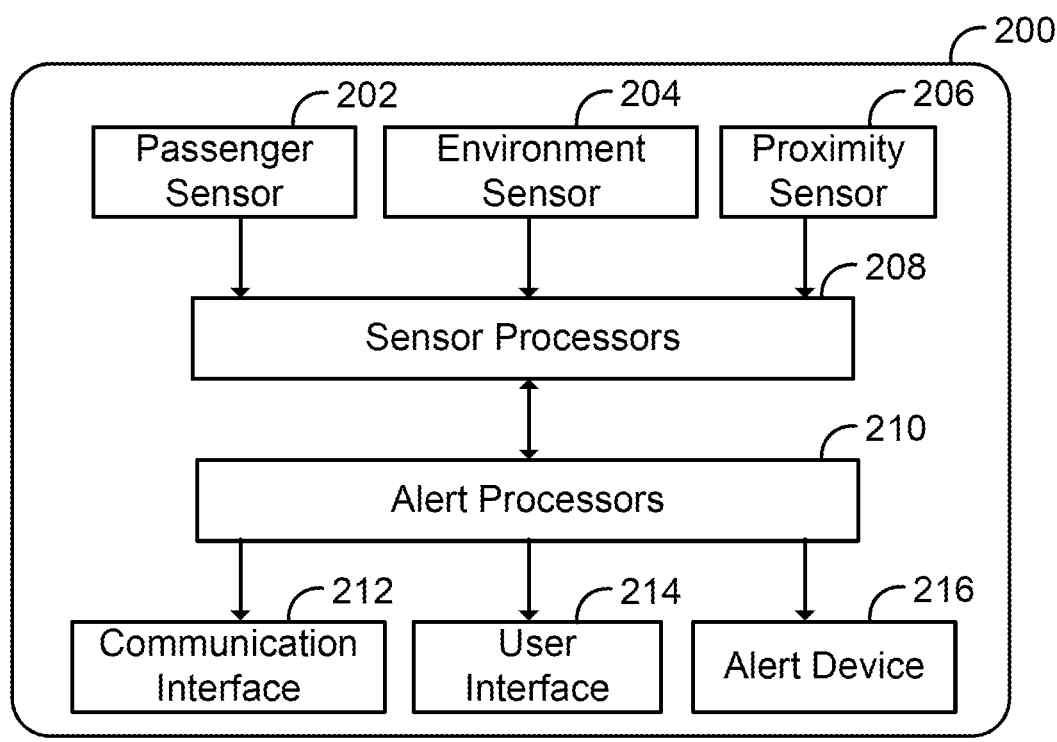
FIG. 2 is an example alert system configured for use with a vehicle.

FIG. 2 is an example alert system 200 configured for use with a vehicle. The alert system 200 can perform various acts and/or functions related to detecting potentially dangerous conditions for a living being inside a vehicle and take one or more responsive actions to address these dangerous conditions, and can be implemented as a computing system. In this disclosure, the term "computing system" means a system that includes at least one computing device, such as computing device 100. In some instances, a computing system can include one or more other computing systems.

It should also be readily understood that computing device 100, alert system 200, and any of the components thereof, can be physical systems made up of physical devices, cloud-based systems made up of cloud-based devices that store program logic and/or data of cloud-based applications and/or services (e.g., for performing at least one function of a software application or an application platform for computing systems and devices detailed herein), or some combination of the two.

In any event, the alert system 200 can include various components, such as a passenger sensor 202, an environment sensor 204, a proximity sensor 206, sensor processors 208, alert processors 210, a communication interface 212, user interface 214, and alert device 216, each of which can be implemented as a computing system or part of a computing system.

The alert system 200 can also include one or more connection mechanisms (shown here as arrowed lines), which connect the illustrated components of alert system 200. In this manner, the illustrated components of alert system 200 can communicate data via the one or more connection mechanisms.

The passenger sensor 202 can take various forms. For example, the passenger sensor 202 can be integrated into one or more seats inside the vehicle. Passenger sensor 202 may be integrated into and/or mounted onto other components of the vehicle, depending on the data collected by the passenger sensor 202 (e.g., integrated into the rearview mirror of the vehicle). Furthermore, passenger sensor 202 may be integrated into and/or mounted onto one or more vehicle components during manufacturing, added after the vehicle is manufactured, or both. For example, passenger sensor 202 may be integrated into an aftermarket component that is added to the existing components of the vehicle (e.g., placed under an aftermarket child seat added to the vehicle). Other configurations are possible.

The passenger sensor 202 can also perform various operations related to detecting whether there is a living being inside the vehicle using various components. For example, the passenger sensor 202 may include one or more weight detection sensors, a seat belt detection sensor, a sound detection sensor, a motion sensor, a thermal imaging sensor, a humidity sensor, an ultra-wide beam sensor, a capacitance sensor (e.g., a sensor to detect moisture in a seat in the vehicle), a temperature sensor, an oxygen sensor, and/or a carbon monoxide sensor, among other sensors, to detect a living being inside the vehicle.

The environment sensor 204 can take various forms. For example, the environment sensor 204 can be integrated into one or more components inside the vehicle. Environment sensor 204 may be integrated into one or more components inside the vehicle during manufacturing, added after the vehicle is manufactured, or both. In a further aspect, environment sensor 204 may be integrated into and/or mounted onto other components of the vehicle depending on the data collected by the environment sensor 204 (e.g., integrated into dashboard and/or windshield of the vehicle).

The environment sensor 204 can also perform various operations related to measuring one or more environmental factors inside the vehicle and may use various types of sensors to do so (including some of the sensors described above used to detect a living being inside the vehicle). For example, the environment sensor 204 may include one or more sensors used to measure the various environmental features inside the vehicle, including temperature, humidity, oxygen level, carbon monoxide level and/or sound, among other possibilities.

The proximity sensor 206 can take various forms. For example, the proximity sensor 206 can be integrated into one or more components inside the vehicle. Proximity sensor 206 may be integrated into one or more components inside the vehicle during manufacturing, added after the vehicle is manufactured, or both. In a further aspect, proximity sensor 206 may be integrated into and/or mounted onto other components of the vehicle depending on the data collected by the proximity sensor 206 (e.g., integrated into dashboard of the vehicle).

The proximity sensor 206 can also perform various operations related to determining the proximity of a computing device that may be remote from the alert system 200 (e.g., outside the vehicle), including some of the sensors described above. For example, the proximity sensor 206 may include: (i) a Bluetooth sensor and/or communication protocol to determine the proximity of a mobile computing device; (ii) a GPS sensor and/or communication protocol to determine the proximity of another entity to the vehicle; and/or (iii) other sensors used for determining proximity and/or location, among other possibilities.

In a further aspect, once passenger sensor 202, environment sensor 204, and/or proximity sensor 206, may be used to collect and/or detect information about the vehicle, environmental factors surrounding the vehicle, and/or the vehicle occupants, among other possibilities. Once this data is collected, that data may be communicated sent to one or more sensor processors 208 that allow the alert system 200 to make a number of determinations, including determining whether an alert condition exists inside the vehicle. In some examples, the alert system 200 may determine, using sensor processors 208, that an alert condition exists inside of the vehicle by detecting, via passenger sensor 202, that a living being is inside the vehicle and that the environmental factors, measured via environment sensor 204, inside the vehicle presents a potentially dangerous condition for the living being inside the vehicle.

In some examples, the alert system 200 may acquire data using passenger sensor 202, environment sensor 204, and/or proximity sensor 206 and then use sensor processors 208 to compare that acquired data an anticipated operational state the vehicle. Once this comparison is made, alert system 200 may determine that either or both do not correspond to the anticipated operational state of the vehicle. For example, the alert system 200 may use sensor processors 208 to compare data acquired by passenger sensor 202, environment sensor 204, and/or proximity sensor 206, at a given time to previous detections and measurements made by the alert system 200. In a further aspect, alert system 200 may use passenger sensor 202, environment sensor 204, proximity sensor 206, and/or sensor processors 208 to do this in a number of ways.

For example, the data collected using passenger sensor 202, environment sensor 204, and/or proximity sensor 206, can be used in connection with one or more specific mathematical models executing on sensor processors 208 to determine whether alert condition exists inside the vehicle at a given time. In one example, the alert system 200 may use one or more machine learning training sets executing on sensor processors 208 to determine one or more anticipated parameters for the vehicle during operation (e.g., which seats in the vehicle typically have weight applied to them (and how much), an average temperature range inside the vehicle during operation, an average sound level inside the vehicle while not in operation, etc.), all or some of which may be used to establish an anticipated operational state of the vehicle.

In a further aspect, the anticipated operational state of the vehicle may be based on detections and/or measurements made for the vehicle using passenger sensor 202, environment sensor 204, and/or proximity sensor 206. For example, the alert system 200 may request, access, compile, and/or assess operational data associated with the vehicle during a particular operational state (e.g., while driving on a highway with a passenger in every seat) and compare that to data requested, accessed, compiled, and/or assessed during another operational state (e.g., while the vehicle is not moving and a passenger is in only one seat). In other examples, the anticipated operational state of the vehicle may be based on one or more vehicles that have one or more attributes in common with the vehicle.

In a further aspect, the alert system 200 may then compare the detection of a living being and measured environmental factor at a given time to the anticipated operational state and determine that they do not correspond. Based on this comparison, the alert system 200 may determine that an alert condition exists (e.g., a small child has been left behind in the potentially dangerous vehicle). Additionally, by implementing one or more machine learning models on sensor processors 208, as more operation data and information is collected using the alert system 200 (both during driver operation of the vehicle (e.g., driving on a highway) and while the driver is not operating the vehicle (e.g., after parking, turning off, and exiting the car)), the more alert system 200 will improve determining whether an alert condition exists, which in turn will improve the alert system's ability to detect and analyze a variety of vehicle situations and/or take one or more responsive actions to help ensure no living being is harmed inside the vehicle.

After an alert condition is determined using passenger sensor 202, environment sensor 204, and/or proximity sensor 206, and one or more specific mathematical models executing on sensor processors 208, the alert condition data can be sent to alert processors 210 for further processing. In one example, the alert processors 210 may include one or more processors configured to select one or more specific computational actions to take based on the determined alert condition. Based on this selection, the alert processors 210 may also transmit one or more instructions that cause a component of the vehicle and/or a remote computing device to perform the selected computation action, a few examples of which are detailed below.

For example, the alert system 200 may use alert processors 210 to send instructions that cause communication interface 212 transmit instructions to mitigate the potentially dangerous conditions associated with the alert condition. In practice, the communication interface 212 can allow the alert system 200 to communicate with the vehicle owner, emergency services, and/or one or more parties and/or devices associated with the alert system 200, via a network interface. Communication interface 212 can also communicate various types of data that can be used for detecting and analyzing data collected in connection with alert system 200.

For example, alert system 200 may use alert processors 210 to send a request to a database using communication interface 212 for one or more computational actions that should be taken in response to the determined alert condition. In response to this request, alert system 200 may also receive this requested data from the database using communication interface 212. The database may include any of a variety of sources (e.g., emergency service databases containing this requested information, specialized support entities relating to various emergency services containing similar information, and so on).

In other examples, alert system 200 may use alert processors 210 to send a request to a computing device associated with the vehicle using communication interface 212 for one or more computational actions that should be taken in response to the determined alert condition (e.g., an alert to a computing device requesting input from a user in response to the alert). In response to this request, alert system 200 may also receive a response to the request from the computing device using communication interface 212 (e.g., "DISMISS" or "ENGAGE SAFETY MODE"). Alert system 200 may also send a request to a computing device associated with an emergency service using communication interface 212 to help respond to the determined alert condition (e.g., a request for help from a nearby police station to investigate whether a living being has been left inside the vehicle). Other examples are possible.

For example, alert system 200 may use alert processors 210 to transmit instructions to a user interface 214 to display information associated with the determined alert condition. For example, based on the alert condition, alert system 200 may use alert processors 210 to transmit instructions to a user interface 214 in the vehicle to display an alert message (e.g., "EMERGENCY—DIALING POLICE"). Alert system 200 may also receive information from a user inside the vehicle. For example, user interface 214 may include a touch-sensitive panel and/or a microphone that allows a user inside of the vehicle to provide further information that the alert system can use to further inform the computational action it takes (or doesn't take) in response to the determined alert condition (e.g., a user inside the vehicle might cancel a call associated with the "EMERGENCY—DIALING POLICE" displayed via the user interface inside the vehicle).

In other examples, alert system 200 may use alert processors 210 to send instructions that cause an alert device 216 to take one or more computational actions in response to the determined alert condition (e.g., a visual and/or audible alert using one or more components of the vehicle). For example, alert system 200 may use alert processors 210 to send instructions that cause one or more audio devices of the vehicle to emit an audible alert inside and/or outside of the vehicle (e.g., causing the vehicle's horn to emit sound repeatedly, an interior and/or exterior speaker to emit "EMERGENCY—PLEASE HELP"). In yet other examples, based on the alert condition, the alert system 200 may alert system 200 may use alert processors 210 to send instructions that cause one or more visual devices of the vehicle to emit visual alerts (e.g., causing the vehicle's interior and/or exterior lights to flash repeatedly).

In a further aspect, the alert system 200 may have one or more dedicated alert components that are mounted on or integrated into existing components of the vehicle. For example, alert system 200 may have one or more exterior lights, speakers, and or displays that are mounted on the windows of the vehicle and emit any number of visual and/or audio alerts, many of which may be from portions of the vehicle that otherwise would not provide such alerts (e.g., a light and alarm speaker mounted the exterior of the rear windows of a vehicle). In a further aspect, because visual and/or audio alerts using existing components of the vehicle (e.g., car alarms and flashing headlights/taillights) may often be ignored by people around the vehicle, dedicated alert components for alert system 200 may improve the efficacy of alert system 200 to provide more effective visual and/or audio alerts that cause people around the vehicle to investigate further (i.e., a higher performance alert). In a further aspect, alert system 200 may use any number of dedicated components that cause more effective visual and/or audio alerts to be emitted outside the vehicle, including, for example, an ultra-bright LED strobe light, one or more panel displays used to display an illuminated alert message outside of the vehicle (e.g. a light-emitting diode (LED) panel displaying a "PLEASE HELP—DANGEROUS CONDITIONS—LIVING BEING DETECTED INSIDE THE VEHICLE"), and/or one or more exterior speakers emitting alert messages outside of the vehicle (e.g. a speaker that emits a loud audible alert message: "PLEASE HELP—DANGEROUS CONDITIONS—LIVING BEING DETECTED INSIDE THE VEHICLE"), among other possibilities.

Other computational actions, displayed messages, audible alerts, visual alerts, and configurations are possible.

C. Example Alert System Vehicle Environment

Figure 3A:
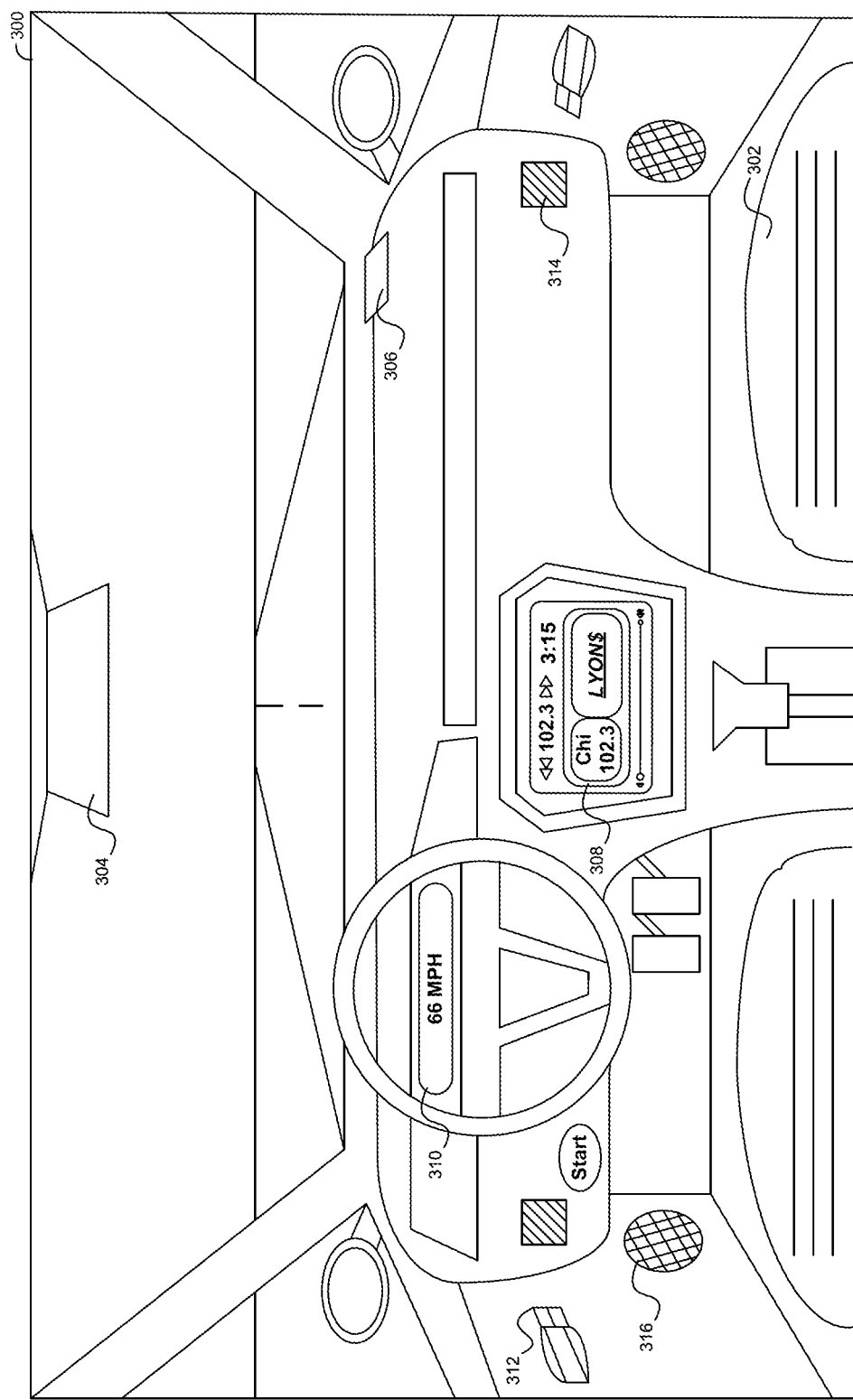
FIG. 3A is an example alert system vehicle environment in a first state.
Figure 3B:
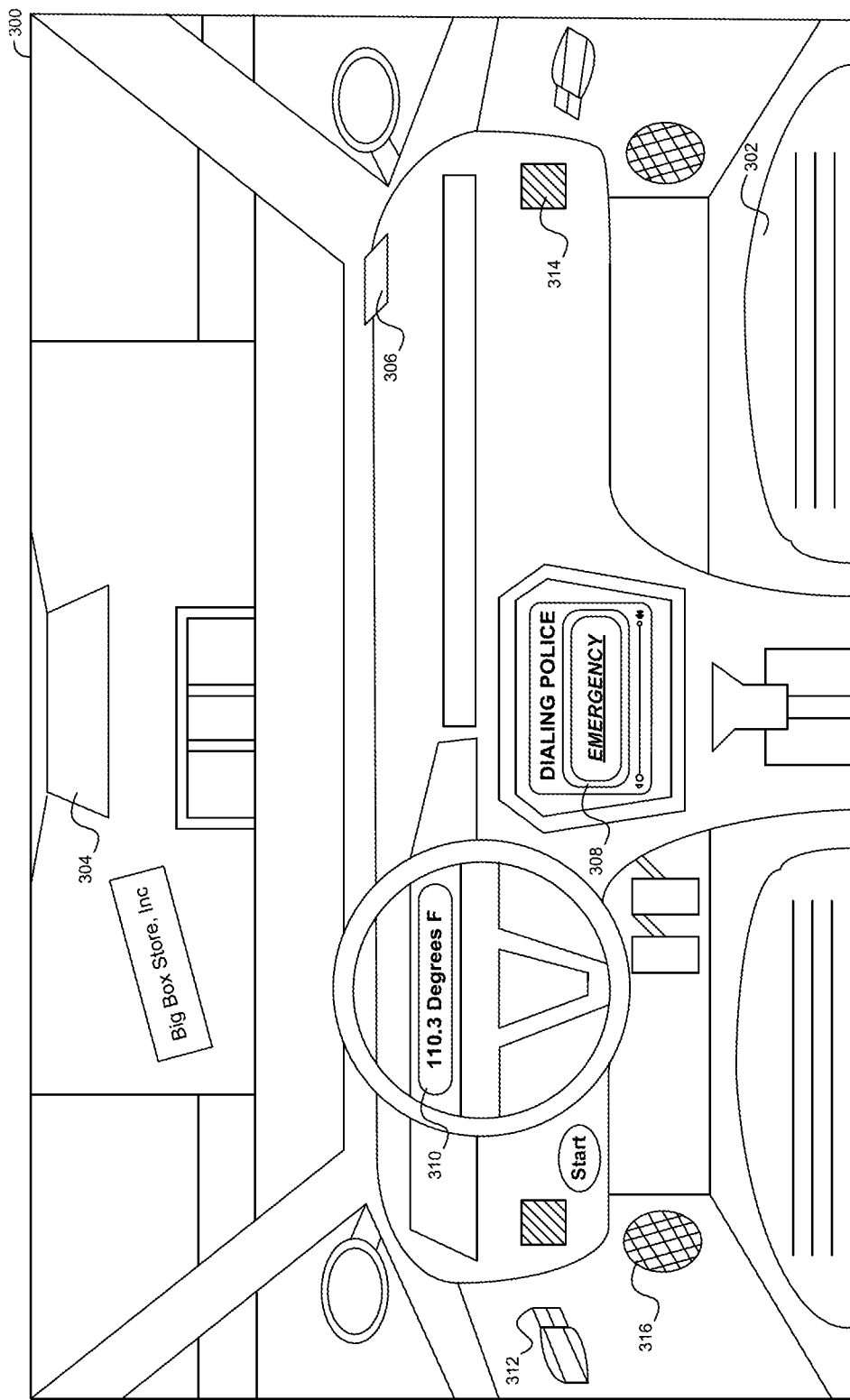
FIG. 3B is the example alert system vehicle environment of 3A, but in a second state.

To further illustrate the above-described concepts and others, FIGS. 3A-3B depict an example environment in which the example alert system 200 depicted in FIG. 2 (as well as other configurations of alert system 200) can be used. Like FIG. 2, these example environments are merely for purposes of illustration. The features described herein may involve environments and vehicles that are configured or formatted differently, include additional or fewer components and/or more or less data, include different types of components and/or data, and relate to one another in different ways.

Turning to FIG. 3A, FIG. 3A depicts an example alert system vehicle environment 300 in a first state. Environment 300 includes a vehicle with a passenger sensor 302 (shown here in the passenger seat of the vehicle), environment sensor 304 (shown here in the rearview mirror of the vehicle), proximity sensor 306 (shown here in the dashboard of the vehicle), communication interface 308, user interface 310, door locks 312, air conditioner vent 314, and one or more speakers 316, all of located inside the vehicle. In this example embodiment, in this first state, passenger sensor 302, environment sensor 304, proximity sensor 306, communication interface 308, user interface 310, door locks 312, air conditioner vent 314, and one or more speakers 316 are operating under operational parameters that do not present the alert conditions detailed above.

Turning back to FIG. 2, to measure the respective operational parameters of the vehicle, alert system 200 may use various components illustrated in FIG. 3A, including passenger sensor 302 (e.g., to measure that there is a passenger in the passenger seat of the vehicle during operation), environment sensor 304 (e.g., to measure that the temperature inside the vehicle does not present a dangerous condition for occupants of the vehicle), and/or proximity sensor 306 (e.g., to determine that a mobile computing device associated with the vehicle and/or alert system 200 is inside the vehicle during operation).

As described above and as described in further detail below, one or more responsive actions may be taken by the alert system 200 to apprise the user and/or others of this information (e.g., by displaying information that is displayed during "normal" operation of the vehicle, including radio station and artist information via communication interface 308 and the vehicle's speed via user interface 310, the alert system 200 may indicate to the driver that the vehicle is operating within anticipated operational parameters). Furthermore, by implementing one or more mathematical models (e.g., machine learning models on sensor processors 208), by collecting operational data and information during "normal" operation of the vehicle (as depicted in FIG. 3A), alert system 200 will improve its ability to detect and analyze a variety of vehicle situations, determine if an alert condition exists, and/or take one or more responsive actions to help ensure no living being is harmed inside the vehicle.

Turning to FIG. 3B, the example alert system vehicle environment 300 is shown in a second state, in which the vehicle has been parked and is turned off, and the driver has exited the vehicle. Specifically, in FIG. 3B, in this second state, unlike FIG. 3A, there are potentially dangerous conditions for a living being left inside the vehicle. Furthermore, while the potentially dangerous conditions are visually illustrated in FIG. 3B (e.g., shown as the "110.3 Degree F." displayed via user interface 310), the presence of dangerous conditions may not be as immediately apparent to someone outside the vehicle.

In this second state, when the alert system 200 measures and analyzes the respective operational parameters of the vehicle (e.g., using sensor processors 208), alert system 200 may determine that one or more of those operational parameters do not correspond to the anticipated operational parameters and that an alert condition exists. For example, in FIG. 3B, alert system 200 may use various components to make this determination, including passenger sensor 302 (e.g., to measure there is still a passenger in the passenger seat of the vehicle, even though the vehicle has been turned off), environment sensor 304 (e.g., to measure that the temperature inside the vehicle is 110.3 Degrees Fahrenheit), and/or proximity sensor 306 (e.g., to determine that a mobile computing device associated with the vehicle and/or alert system 200 is outside a predetermined proximity of the vehicle, indicating that the driver is far away).

Based on this determination, alert system 200, may then select one or more computational actions to be taken by one or more components of the vehicle and/or remote computing devices, and transmit instructions for those components and/or devices to perform those computational actions. As described above and as described in further detail below, one or more of several computational actions may also be taken by the alert system 200 to apprise the driver, vehicle owner, and/or others of this information as well.

For example, based on determining that an alert condition exists inside of the vehicle, alert system 200 may select one or more computational actions and transmit instructions (e.g., using alert processors 210) to one or more components of the vehicle. For example, in FIG. 3B, alert system 200 may select one or more computational actions and transmit instructions that cause: (i) communication interface 308 to place a call to a nearby police station and display an indication of the call; (ii) user interface 310 to display the measured temperature inside the car and create a visual alert (e.g., flashing one or more lights of user interface 310 that can be seen inside and/or outside of the vehicle); (iii) door locks 312 to unlock the vehicle's doors; (iv) air conditioner vent 314 to emit air conditioning inside the car; and/or (v) one or more speakers 316 to emit an audio alert inside the vehicle (which may be loud enough to be heard outside the vehicle, but not loud enough to damage the hearing or otherwise harm the living being inside the vehicle. Other examples and configurations are possible.

D. Example Alert System and Graphical User Interface

For example, to further illustrate the above-described concepts and others, FIG. 4 depicts a graphical user interface, in accordance with example embodiments. Although illustrated in FIG. 4 as being displayed via a user interface of remote computing device 404, this graphical user interface may be provided for display by one or more components of the alert system 402 (e.g., via the user interface 214 in connection with alert system 200), among other possibilities.

The information displayed by the graphical user interfaces may also be derived, at least in part, from data stored and processed by the components described in connection with the alert system 402, and/or other computing devices or systems configured to generate such graphical user interfaces and/or receive input from one or more users (e.g., those described in connection with alert system 200, as well as the components of FIGS. 2, 3A, and 3B). In other words, this graphical user interface is merely for the purpose of illustration. The features described herein may involve graphical user interfaces that format information differently, include more or less information, include different types of information, and relate to one another in different ways.

Figure 4A:
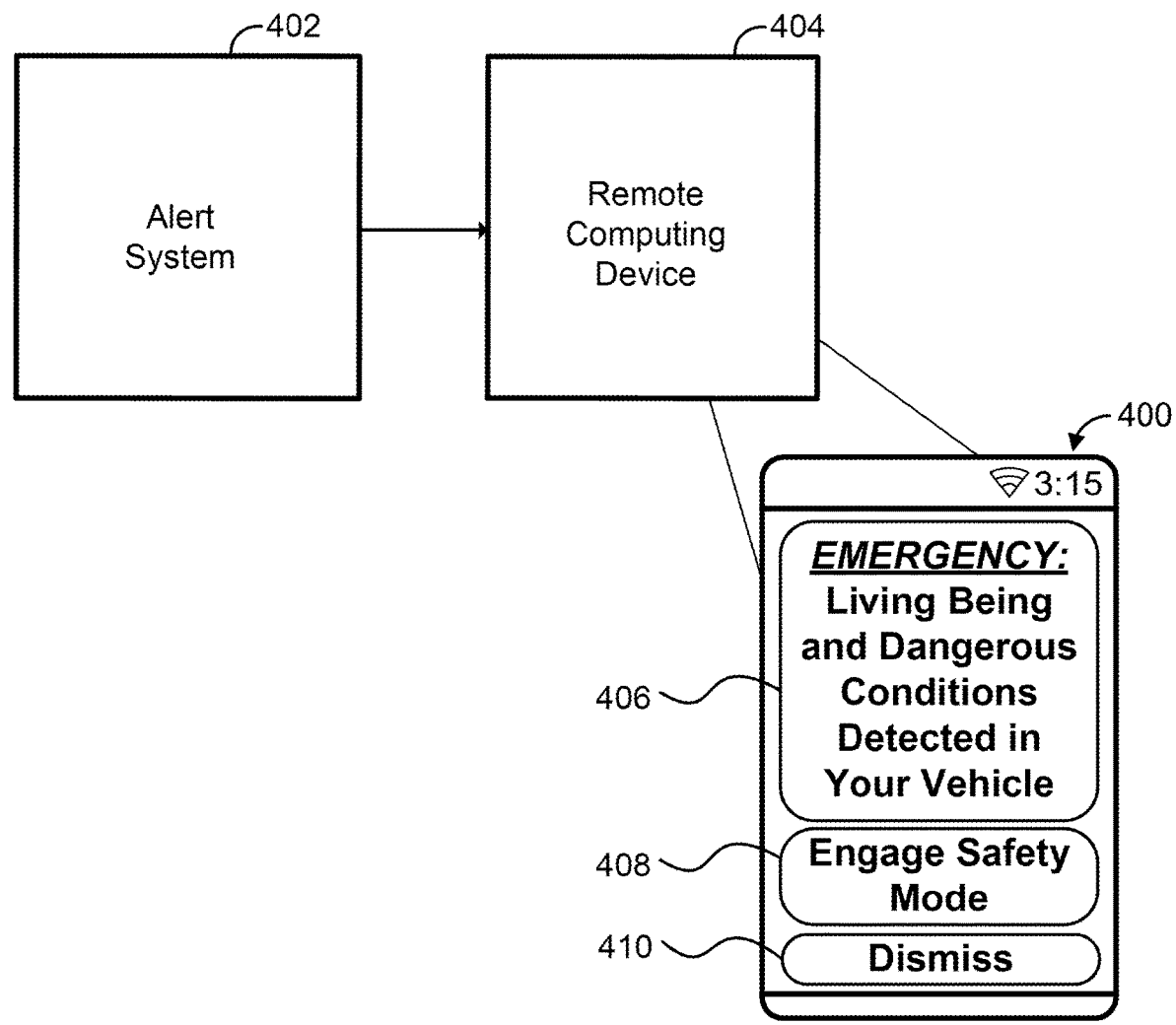
FIG. 4A is an example alert system and graphical user interface in a first state.
Figure 4B:
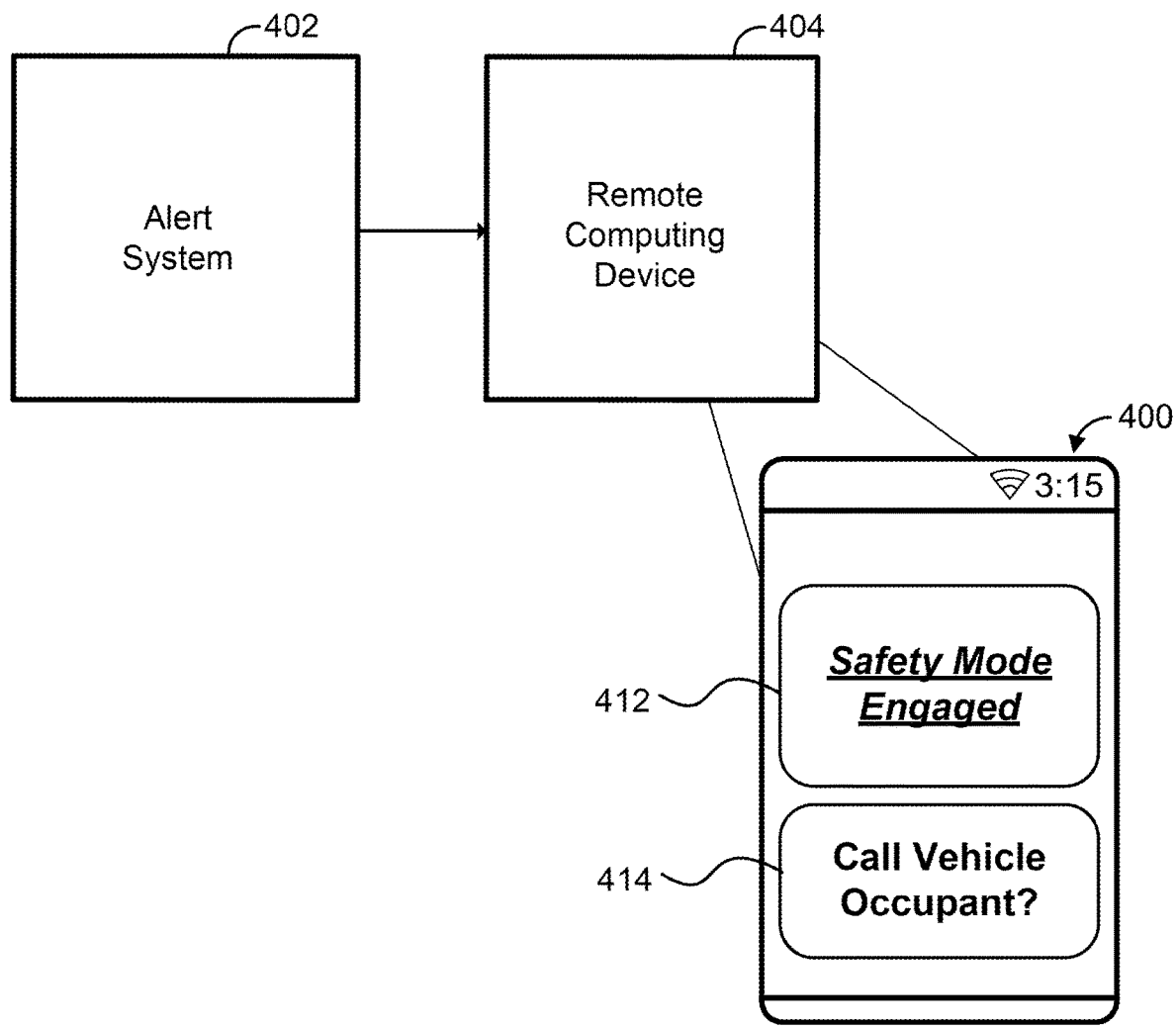
FIG. 4B is the example alert system and graphical user interface of 4A, but in a second state.

Turning to FIGS. 4A-4B, FIG. 4A depicts an example graphical user interface 400 in a first state. Interface 400 includes visual alerts that notify the user of a remote computing device 404 associated with the vehicle, the alert system 402, or both that an alert condition and/or dangerous condition has been detected inside the vehicle (e.g., using passenger sensor 302, environment sensor 304, proximity sensor 306, as illustrated in FIGS. 3A-B above) and presents the user with visual indications of responsive actions that may be taken in response to the detected alert conditions.

Specifically, in the context of FIG. 4A, these alerts include information concerning the alert message 406 (shown here as "EMERGENCY: Living Being and Dangerous Conditions Detected Inside Your Vehicle"), a safety mode prompt 408 (shown here as "Engage Safety Mode"), and dismiss prompt 410 (shown here as "Dismiss"). Depending on the user's interaction with interface 400, several example responsive action may be taken by alert system 402. For example, if the user selects dismiss prompt 408, the alert system may take no further action. In other examples, if the user selects dismiss prompt 408, the alert system may take no further action for a period of time (e.g., two minutes) and if the alert system 402 determines that the alert condition still exists, it may issue an instruction to remote computing device 404 to display the alert message 406, safety mode prompt 408, and/or dismiss prompt 410, again, and so on.

Additionally or alternatively, if the user selects safety mode prompt 408, the remote computing device may transmit instructions and/or information to the alert system 402 that causes the alert system 402 to take one or more computational actions to address the alert condition (e.g., those described in connection with FIGS. 2, 3A, and 3B, above).

For example, similar to FIG. 4A, FIG. 4B shows the graphical user interface 400 of FIG. 4A, but in a second state that results from a user selecting safety mode prompt 408. In the second state, because the user has selected the safety mode prompt 408, the alert system 402 has taken one or more computational actions to address the alert condition (e.g., turn on the air conditioner, unlock the door, cause various visual and/or audio alerts to be displayed, as well as other computational actions described in connection with FIGS. 2, 3A, and 3B, above) and displays a confirmation message 412 (shown here as "SAFETY MODE ENGAGED") indicating the same. In this second state, the remote computing device 404 also may display one or more graphical prompts that all the user, the remote computing device, and/or the alert system 402, to take additional actions.

For example, as illustrated in FIG. 4B, the user may be presented with a communication prompt 414 (shown here as "Call Vehicle Occupant?"), that, if engaged, may allow the user, the remote computing device, and/or the alert system 402, to take further actions to address the alert condition (e.g., talk to the living being inside the vehicle using the remote computing device 404 and/or components of the vehicle (microphones, speakers, user interfaces, etc. inside the vehicle)). In this way, the user may be apprised alert conditions and/or dangerous conditions inside the vehicle detected by alert system 402 and responsively prompted to take actions to correct the those conditions (and given instructions on how to do so).

These example graphical user interfaces are merely for purposes of illustration. The features described herein may involve graphical user interfaces that are configured or formatted differently, include more or less information and/or additional or fewer instructions, include different types of information and/or instructions, and relate to one another in different ways.

E. Example Method

Figure 5:
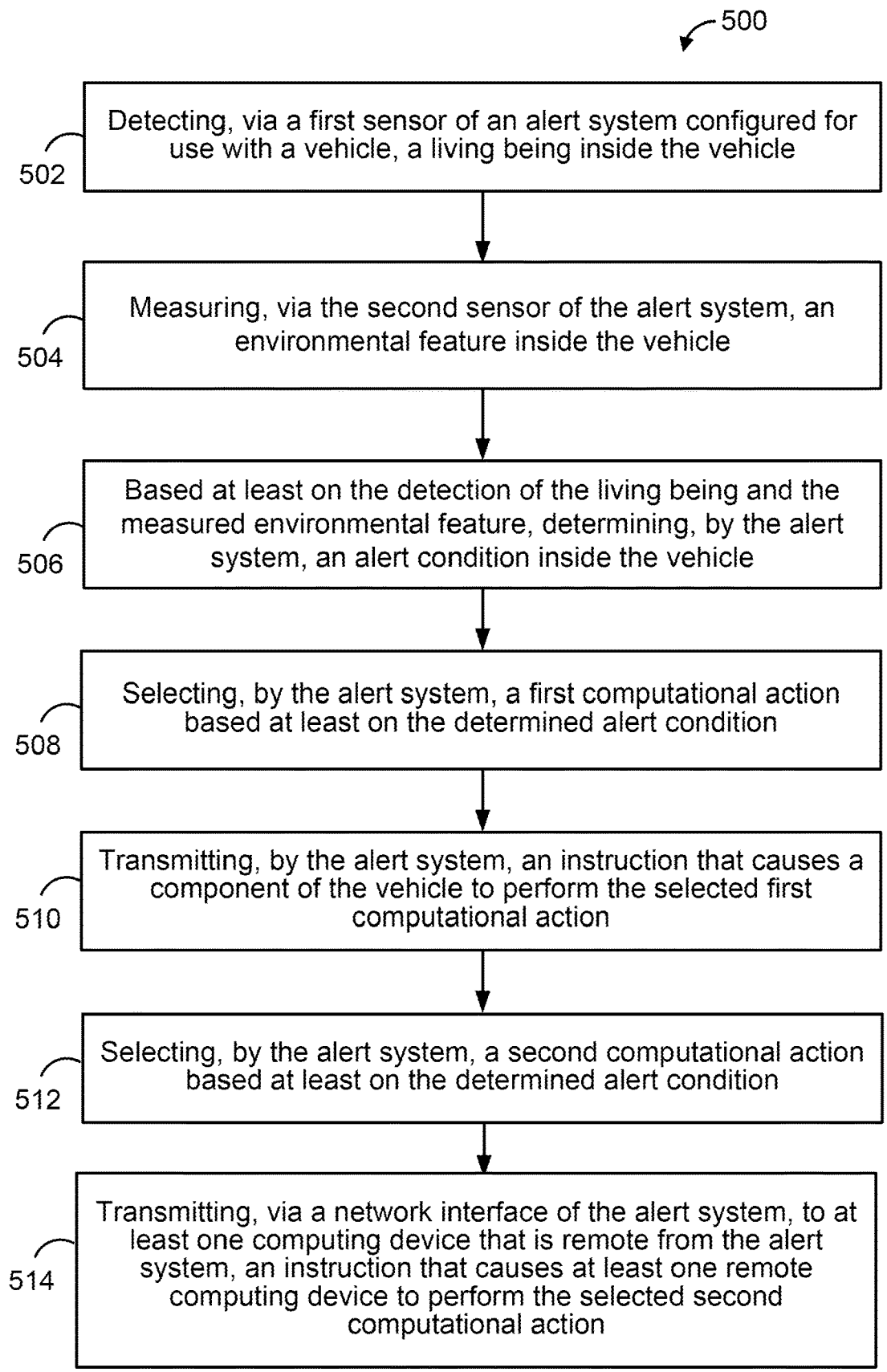
FIG. 5 is a flow chart of an example method.

FIG. 5 is a flow chart illustrating an example method 500.

At block 502, the method 500 can include, detecting, via a first sensor of an alert system configured for use with a vehicle, a living being inside the vehicle. In some examples, the first sensor comprises a weight detection sensor in one or more seats inside the vehicle. In other examples, the first sensor comprises a seatbelt detection sensor in one or more seats inside the vehicle. In other examples, the first sensor comprises a sound detection sensor inside the vehicle.

At block 504, the method 500 can include, measuring, via a second sensor of the alert system, an environmental feature inside the vehicle. In some examples, measuring, via the second sensor of the alert system, an environmental feature inside the vehicle includes measuring one or more of the following environmental features inside the vehicle: (i) temperature; (ii) humidity; (iii) oxygen level; and (iv) carbon monoxide level.

At block 506, the method 500 can include, based at least on the detection of the living being and the measured environmental feature, determining, by the alert system, an alert condition inside the vehicle. In some examples, determining an alert condition inside the vehicle includes determining that the detection of the living being and the measured environmental feature do not correspond to an anticipated operational state of the vehicle. In some examples, the anticipated operational state of the vehicle comprises one or more previously determined operational states of the vehicle. In other examples, the anticipated operational state of the vehicle comprises one or more previously determined operational states of a second vehicle with one or more attributes in common with the vehicle.

At block 508, the method 500 can also include, selecting, by the alert system, a first computational action based at least on the determined alert condition. In some examples, the first computational action includes displaying an alert message inside the vehicle. In other examples, the selected first computational action includes emitting an alert message outside the vehicle. In other examples, the selected first computational action includes emitting a visual alert outside the vehicle.

At block 510, the method 500 can also include, transmitting, by the alert system, an instruction that causes a component of the vehicle to perform the selected first computational action. In some examples, transmitting, by the alert system, an instruction that causes a component of the vehicle to perform the selected first computational action includes transmitting, by the alert system, an instruction that causes a graphical user interface inside the vehicle to display the alert message. In some examples, transmitting an instruction that causes a component of the vehicle to perform the selected first computational action includes transmitting an instruction that causes an audio device of the vehicle to emit the alert message outside the vehicle. In other examples, transmitting an instruction that causes a component of the vehicle to perform the selected first computational action includes transmitting an instruction that causes one or more lights of the vehicle to emit the visual alert outside the vehicle.

At block 512, the method 500 can also include, selecting, by the alert system, a second computational action based at least on the determined alert condition. In some examples, the selected second computational action includes reporting an emergency message.

At block 514, the method 500 can also include, transmitting, via a network interface of the alert system, to at least one computing device that is remote from the alert system, an instruction that causes at least one remote computing device to perform the selected second computational action. In some examples, transmitting, via the network interface, an instruction that causes the at least one remote computing device to perform the selected second computational action includes transmitting an instruction to at least one emergency service computing device that is remote from the alert system to provide emergency services to the vehicle.

In other examples embodiments, the method 500 includes determining, via a third sensor of the alert system, that the at least one remote computing device is outside a threshold proximity to the vehicle, and wherein selecting a second computational action based at least on the determined alert condition includes generating an alert message, and wherein transmitting, via the network interface, an instruction that causes the at least one remote computing device to perform the selected second computational action includes transmitting an instruction, via the network interface, that causes the at least one remote computing device to display the generated alert message.

III. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. An alert system configured for use with a vehicle, the alert system comprising:
   a first sensor;
   a second sensor;
   a network interface configured to communicate with at least one computing device that is remote from the alert system;
   one or more processors; and
   a non-transitory, computer-readable medium storing instructions that, when executed by the one or more processors, cause the alert system to perform a set of operations comprising:
      detecting, via the first sensor, a living being inside the vehicle;
      measuring, via the second sensor, an environmental feature inside the vehicle;
      based at least on the detection of the living being and the measured environmental feature, determining an alert condition inside the vehicle, wherein determining the alert condition inside the vehicle comprises determining that the detection of the living being and the measured environmental feature do not correspond to an anticipated operational state of the vehicle, and wherein the anticipated operational state of the vehicle comprises one or more previously determined operational states of a second vehicle with one or more attributes in common with the vehicle;
      selecting a first computational action based at least on the determined alert condition;
      transmitting an instruction that causes a component of the vehicle to perform the selected first computational action;
      selecting a second computational action based at least on the determined alert condition; and
      transmitting, via the network interface, an instruction that causes the at least one remote computing device to perform the selected second computational action.

2. The alert system of claim 1, wherein the first sensor comprises a weight detection sensor in one or more seats inside the vehicle.

3. The alert system of claim 1, wherein the first sensor comprises a seatbelt detection sensor in one or more seats inside the vehicle.

4. The alert system of claim 1, wherein the first sensor comprises a sound detection sensor inside the vehicle.

5. The alert system of claim 1, wherein measuring, via the second sensor, an environmental feature inside the vehicle comprises measuring one or more of the following environmental features inside the vehicle: (i) temperature; (ii) humidity; (iii) oxygen level; and (iv) carbon monoxide level.

6. The alert system of claim 1, wherein the anticipated operational state of the vehicle comprises one or more previously determined operational states of the vehicle.

7. The alert system of claim 1, wherein the selected first computational action comprises displaying an alert message inside the vehicle, and wherein transmitting an instruction that causes a component of the vehicle to perform the selected first computational action comprises transmitting an instruction that causes a graphical user interface inside the vehicle to display the alert message.

8. The alert system of claim 1, wherein the selected first computational action comprises emitting an alert message outside the vehicle, and wherein transmitting an instruction that causes a component of the vehicle to perform the selected first computational action comprises transmitting an instruction that causes an audio device of the vehicle to emit the alert message outside the vehicle.

9. The alert system of claim 1, wherein the selected first computational action comprises emitting a visual alert outside the vehicle, and wherein transmitting an instruction that causes a component of the vehicle to perform the selected first computational action comprises transmitting an instruction that causes one or more lights of the vehicle to emit the visual alert outside the vehicle.

10. The alert system of claim 1, wherein the selected second computational action comprises reporting an emergency message, and wherein transmitting, via the network interface, an instruction that causes the at least one remote computing device to perform the selected second computational action comprises transmitting an instruction to at least one emergency service computing device that is remote from the alert system to provide emergency services to the vehicle.

11. The alert system of claim 1, further comprising a third sensor, and wherein the set of operations further comprises:
   determining, via the third sensor, that the at least one remote computing device is outside a threshold proximity to the vehicle, and wherein selecting a second computational action based at least on the determined alert condition comprises generating an alert message, and wherein transmitting, via the network interface, an instruction that causes the at least one remote computing device to perform the selected second computational action comprises transmitting an instruction, via the network interface, that causes the at least one remote computing device to display the generated alert message.

12. The alert system of claim 1, wherein the one or more attributes of the second vehicle in common with the vehicle comprise the make and model of the second vehicle.

13. The alert system of claim 12, wherein the anticipated operational state of the vehicle comprises an average weight applied to one or more seats of a second vehicle having the same make and model of the vehicle while not in operation.

14. The alert system of claim 1, wherein the one or more attributes of the second vehicle in common with the vehicle comprise an average interior temperature for the second vehicle wherein the second vehicle is in the same geographic region as the vehicle.

15. The alert system of claim 1, wherein the one or more attributes of the second vehicle in common with the vehicle comprise an average humidity range for the second vehicle wherein the second vehicle is in the same geographic region as the vehicle.

16. The alert system of claim 1, wherein the anticipated operational state of the vehicle is based on detections made by the second vehicle with one or more attributes in common with the vehicle.

17. The alert system of claim 1, wherein the anticipated operational state of the vehicle is based on data stored in a database, and comprises one or more attributes of the second vehicle in common with the vehicle.

18. A method comprising:
   detecting, via a first sensor of an alert system configured for use with a vehicle, a living being inside the vehicle;
   measuring, via a second sensor of the alert system, an environmental feature inside the vehicle;
   based at least on the detection of the living being and the measured environmental feature, determining, by the alert system, an alert condition inside the vehicle, wherein determining the alert condition inside the vehicle comprises determining that the detection of the living being and the measured environmental feature do not correspond to an anticipated operational state of the vehicle, and wherein the anticipated operational state of the vehicle comprises one or more previously determined operational states of a second vehicle with one or more attributes in common with the vehicle;

selecting, by the alert system, a first computational action based at least on the determined alert condition;

transmitting, by the alert system, an instruction that causes a component of the vehicle to perform the selected first computational action;

selecting, by the alert system, a second computational action based at least on the determined alert condition; and transmitting, via a network interface of the alert system, to at least one computing device that is remote from the alert system, an instruction that causes at least one remote computing device to perform the selected second computational action.

19. The method of claim 18, wherein the first sensor comprises a weight detection sensor in one or more seats inside the vehicle.

20. The method of claim 18, wherein the first sensor comprises a seatbelt detection sensor in one or more seats inside the vehicle.

21. The method of claim 18, wherein the first sensor comprises a sound detection sensor inside the vehicle.

22. The method of claim 18, wherein measuring, via the second sensor of the alert system, an environmental feature inside the vehicle comprises measuring one or more of the following environmental features inside the vehicle: (i) temperature; (ii) humidity; (iii) oxygen level; and (iv) carbon monoxide level.

23. The method of claim 18, wherein the selected first computational action comprises displaying an alert message inside the vehicle, and wherein transmitting, by the alert system, an instruction that causes a component of the vehicle to perform the selected first computational action comprises transmitting, by the alert system, an instruction that causes a graphical user interface inside the vehicle to display the alert message.

24. A non-transitory computer-readable medium, having stored thereon program instructions that, upon execution by a computing system, cause the computing system to perform a set of operations comprising:

detecting, via a first sensor of an alert system configured for use with a vehicle, a living being inside the vehicle;

measuring, via a second sensor of the alert system, an environmental feature inside the vehicle;

based at least on the detection of the living being and the measured environmental feature, determining, by the alert system, an alert condition inside the vehicle, wherein determining the alert condition inside the vehicle comprises determining that the detection of the living being and the measured environmental feature do not correspond to an anticipated operational state of the vehicle, and wherein the anticipated operational state of the vehicle comprises one or more previously determined operational states of a second vehicle with one or more attributes in common with the vehicle;

selecting, by the alert system, a first computational action based at least on the determined alert condition;

transmitting, by the alert system, an instruction that causes a component of the vehicle to perform the selected first computational action;

selecting, by the alert system, a second computational action based at least on the determined alert condition; and transmitting, via a network interface of the alert system, to at least one computing device that is remote from the alert system, an instruction that causes at least one remote computing device to perform the selected second computational action.

* * * * *